United States Patent [19]
Falgout, Sr.

[11] Patent Number: 5,205,789
[45] Date of Patent: Apr. 27, 1993

[54] FLEXIBLE DRILLING MOTOR COUPLING

[76] Inventor: Thomas E. Falgout, Sr., 110 Bellaire Rd., Lafayette, La. 70503

[21] Appl. No.: 782,090

[22] Filed: Oct. 24, 1991

[51] Int. Cl.⁵ .................................................. F16D 3/18
[52] U.S. Cl. ...................................... 464/157; 403/57; 403/348; 464/106; 464/901
[58] Field of Search ............... 464/106, 137, 138, 157, 464/901, 110; 175/320; 403/57, 74, 287, 348

[56] References Cited

U.S. PATENT DOCUMENTS

| | | | |
|---|---|---|---|
| 763,127 | 6/1904 | Tilden | 464/157 |
| 956,151 | 4/1910 | Schwitzer | |
| 2,217,969 | 10/1940 | Schairer | 464/157 X |
| 2,854,829 | 10/1958 | Porter | 403/74 X |
| 3,059,950 | 10/1962 | Hedges | 403/74 |
| 3,325,197 | 6/1967 | Wehner | 403/57 |
| 4,391,547 | 7/1983 | Jackson, Jr. et al. | 464/157 X |
| 4,962,818 | 10/1990 | DeLucia | 175/107 X |
| 5,073,145 | 12/1991 | Ratzokwski et al. | 464/157 |

Primary Examiner—Daniel P. Stodola
Assistant Examiner—William G. Battista, Jr.
Attorney, Agent, or Firm—John D. Jeter

[57] ABSTRACT

A modified jaw type shaft coupling has two opposed members arranged to allow limited flexure about a point that is the geometric center of mating spherical surfaces, a concave surface on one member and a mating convex surface on the other member. One member is attached to each shaft to be rotationally and axially coupled. The jaws on one coupling member have lugs that extend radially inward to axially entrap a larger flange attached to the other coupling member. The flange has notches to allow the flange to axially traverse the lugs. The flange is then rotated relative to the lugs to allow the flange to oppose the lugs. The flange is secured to the other coupling member after the coupling members are axially moved together to allow the jaws to interdigitate to provide rotational coupling. The convex and concave surfaces cooperate to accept axial compressive loads and the flange and lugs prevent axial separation.

13 Claims, 1 Drawing Sheet

FLEXIBLE DRILLING MOTOR COUPLING

This invention pertains to couplings used in drilling motors to connect the power producing rotor to the output shaft. The coupling is especially adapted to connecting power rotors that orbit about their rotational centerline to output shafts that are bearingly supported for rotation within the same body as the rotor. The coupling is also usable for connecting non-orbiting rotors to output shafts that rotate about intersecting centerlines.

BACKGROUND

Drilling motors used at the lower end of drill strings to drive drill heads are well established in the art. Most such motors are powered by the drilling mud forced down the drill string bore but some are electric powered. Drilling motors commonly have output shafts to accept the drill head and such shafts are constructed and supported to accept the shock of movement along the well bore as well as the normal drilling loads applied to the drill head, or drill bit. The power producing rotor is usually constrained radially by the associated housing. If the rotor can accept some axial position change, it is prudent to use the robust output shaft to accept axial forces experienced by the rotor. If the rotational axis of the rotor is subject to mis-alignment from the rotational axis of the output shaft the connection between the two must be effectively flexible. In mud driven motors the rotor is occasionally urged upward by reverse circulation and the coupling must accept tension forces. When the drilling mud is moving downward the coupling must accept the resulting compression forces.

Historically, flexible motor couplings have been the critical factor in determining motor drilling life. Jaw couplings are in common use in drilling motors. It is the means to cope with the axial forces transmitted through the jaw couplings that appears to be the weakening factor. The primary points of novelty of this invention relate to the axial force bearing combination that limit the jaw coupling features to transmitting only rotational effort. To the extent that the jaw coupling features are adapted to cooperate with the axial force bearing elements, those adaptations are also part of the novel features herein disclosed.

Most mud powered drilling motors in current use have rotors that orbit a centerline and rotate about an axis that is somewhat displaced from that centerline. To connect the orbiting rotor to an output shaft that is rotating about a fixed centerline, two flexible couplings are needed that are axially spaced by a connecting intermediate shaft. The coupling of this invention can serve as either one or both such couplings. Some drilling motors have non-orbiting power rotors, electric motors and turbines for instance, housed in bent bodies for directional control. These motors have rotors and output shafts that rotate about intersecting axes and need flexible couplings such as that of this invention.

Motor rotors normally terminate in shaft-like ends for attachment of connecting features and, for the purpose of this application, may be referred to as shafts or machine members.

It is therefore an object of this invention to provide a flexible motor coupling of simple and durable construction that can accept forces in both axial directions.

It is another object of this invention to provide a flexible motor coupling that carries axial forces on expendable elements removable from the torque conducting elements.

It is yet another object of this invention to provide a flexible motor coupling with axial force carrying elements that define the points of intersection of axes of rotation of the connected rotating members.

These and other objects, advantages, and features of this invention will be apparent to those skilled in the art from a consideration of this specification, including the attached claims and appended drawings.

SUMMARY

A flexible shaft coupling of the general configuration of a jaw coupling has two primary members situated in opposition with each having a plurality of axially extending jaws that interdigitate when the two are moved axially together. The two members are to be secured to separate shafts to be rotationally connected and each member has means for connecting to its cooperating shaft. Consider both members to be generally symmetrical about an extended centerline. To secure the members together to resist axial forces in both axial directions, ball and socket surfaces are situated with spherical centers on the centerline at about midway along the jaws. The jaws provide torque transmitting surfaces and the spherical surfaces accept axial compressive loads. Consider the member with the socket to be the driving member. To prevent axial separation of the members, the driving member has lugs that extend radially inward to a diameter smaller than a flange on the driven member. The flange is captured between the lugs and the socket. To enable the flange to pass the lugs, the flange has peripheral slots that allow the lugs to pass axially through the flange. The flange is then rotated relative to the driving member to bring the remaining periphery of the flange into an interfering relationship with the lugs if separating movement occurs. Once the coupling is assembled the jaws prevent relative rotary movement between members. To permit flange rotation for assembly it is independent of the driven member during assembly and is installed and rotated before the two members are assembled. The flange is made part of the ball that bears on the socket. The resulting element has a cylindrical extension that fits into a generally central bore in the driven member. The element is retained in the bore by a set screw. The jaws on the driven member have a bore that approximates diameter of the lugs. The slots accept the driven member jaws with some clearance to permit flexure of the coupling to allow the connected shafts to rotate about separate axes that intersect at the geometric center of the ball and socket spherical surfaces. The convex surface describes only a partial ball, terminating at the flange. The jaws also have clearances between opposed surfaces to permit some flexure of the coupling.

The socket surface is inside the driving member and wears from rubbing due to flexure. It is best made expendable and is formed on one end of a short cylinder confined in a bore along the general centerline of the driving member.

BRIEF DESCRIPTION OF DRAWINGS

In the drawings wherein like features have similar captions.

DETAILED DESCRIPTION OF DRAWINGS

Figure 1:
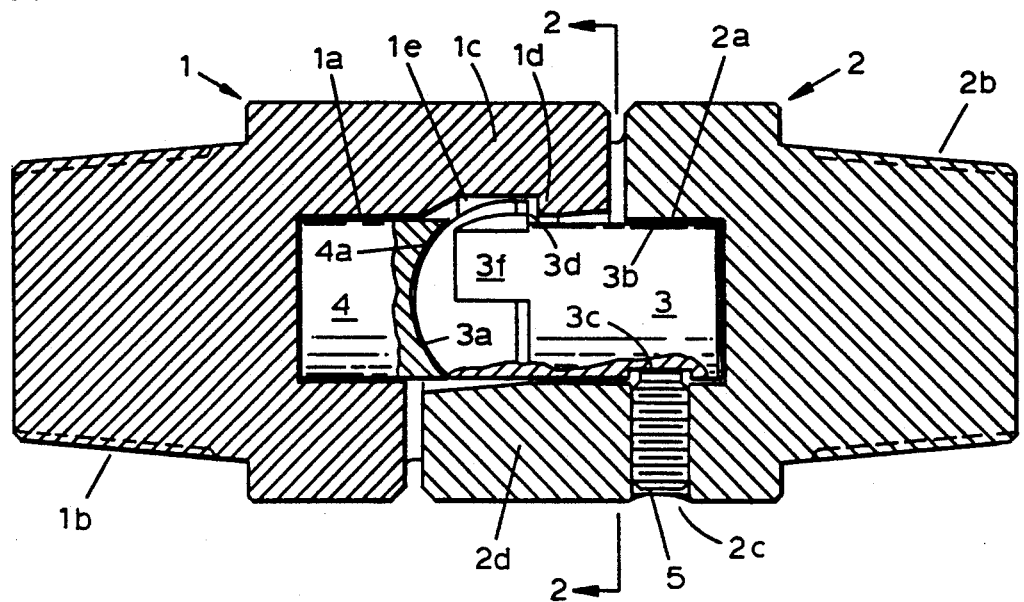
FIG. 1 is an elevation, mostly cut away, of the assembled coupling.

FIG. 1 shows the preferred embodiment of the invention. Member 1 is half of a rotational shaft coupling often referred to as a jaw coupling. Member 2 would normally be identical in the traditional jaw coupling, but it differs from member 1 for the purpose being served. Both members have alternate jaws and recesses extending axially toward the other member. The jaws of each member interdigitate into the recesses of the other member to provide rotational coupling. The preferred arrangement provides three equally spaced jaws on each member. Both members have tapered and threaded ends 1b and 2b as means to attach to the shafts connected by the coupling. Cylindrical bore 1a accepts thrust element 4 which has concave spherical surface 4a on one end. Member 2 has bore 2a to accept the cylindrical end 3b of thrust element 3. Element 3 has convex spherical surface 3a sized to fit into the socket formed by surface 4a. Element 3 is held in place axially and rotationally by set screw 5 in threaded hole 2c which engages recess 3c. Surface 3a terminates at a diameter larger than the diameter of 3b to form shoulder 3d. Projection 1d extends radially inward from jaw 1c to engage shoulder 3d to prevent axial separation of the two members.

There are three jaws 1c and each extends peripherally about the general center of spherical surface 3a somewhat less than sixty degrees separated by recesses somewhat wider peripherally than the jaws. To insert element 3 into the opening 1e, three slots 3f are cut in element 3 to accept projections 1d. When surfaces 3a and 4a are in contact, element 3 is rotated sixty degrees. Shoulders 3d and projections 1d then have the interfering relationship shown and the enlarged end of element 3 is accepted in the radially enlarged opening 1e. Member 3 is then axially advanced into interdigitating relationship with member 2 as shown. The cylindrical end 3b slides into bore 2a during assembly and set screw 5 is tightened. Separation is prevented by interference of projections 1d and abutment 3d. Jaws 2d have no enlarged opening such as 1e and the jaws 2d extend through slots 3f with clearance to allow flexing of the coupling at the center of the spherical surfaces.

For drilling motor use the axes of rotation of the two members are expected to intersect at the geometric center of surface 3a. Deflection of the axes of rotation of the two members is usually about five degrees. The deflection is permitted by clearance between adjacent surfaces of the jaws and jaw separating recesses. There is also clearance between shoulder 3d and the opposing surface on projection 1d.

Under some conditions, in drilling motors, the members tend to separate axially and the shoulder and projections prevent such separation. Under those conditions, rotation of the motor may occur but never under major axial load. When the usual mud driven motor is driving a drill bit there is considerable axial compressive load and surfaces 3a and 4a distribute that load over some area and nutate as a competent bearing.

To extend the life of the spherical bearing surfaces a rubber sleeve may encase the major periphery of the assembled coupling and the sleeve may be filled with grease.

Figure 2:
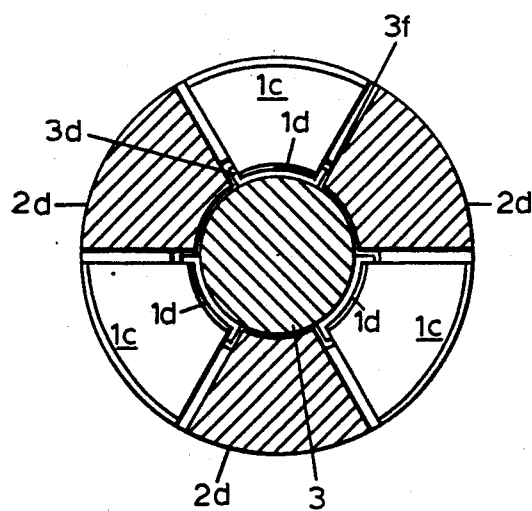
FIG. 2 is a sectional view taken along line 2—2 of FIG. 1.

In FIG. 2 the relationships between the slots 3f and jaws 2d are shown. The interference relationship between shoulder 3d and projections 1d can be seen.

Figure 3:
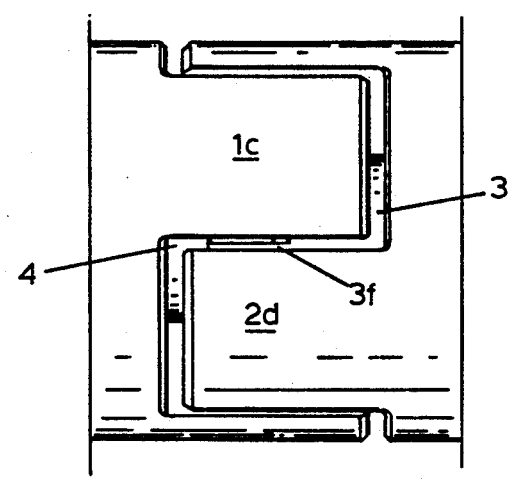
FIG. 3 is an elevation of a selected area of the coupling of FIG. 1.

FIG. 3 shows the usual relationship between the jaws and the recesses in jaw coupling construction.

Set screw 5 is satisfactory on smaller motors. Very large motors can be secured by a cross pin extending through the diameter of member 2 in place of the set screw.

When two couplings are to be used, separated axially by an intermediate shaft, the jaws can be machined on opposite ends of the shaft to form the equivalent of members 1 and 2, eliminating the attachment means 1b or 2b.

The number of jaws best suited for particular applications depends largely upon the relationship of torque conducting wear surface area and jaw strength required. Different numbers of jaws demand different width of slots and recesses, and different amounts of rotation of the axial stress element to align with lugs.

For flexing jaw couplings, the contacting surface of adjacent jaws that engage to transmit torque rarely have the simple geometry described herein. Field experience and wear geometry aids in defining the best details of wear surface shape. The best shape depends upon the degree of flexing required, the consistency of the amount of angle between connected shafts, as well as material and other factors. Such configurations are not part of claimed matter and hence the simple configuration should suffice.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, we claim:

1. A shaft coupler for rotationally and axially connecting two machine members, each of which may rotate about an independent axis with the two axes intersecting at a point within the coupling and deflect an amount that may vary between zero and a preselected angle, the coupling comprising:
   (a) a first member, with a centerline coincident with one of the axes, having attachment means at a first end to attach to one of the machine members, a generally central bore opening toward the second end, a first plurality of jaws peripherally spaced about and extending from said second end some distance along said centerline with first openings therebetween opening radially outward from said first bore, said first bore having a reduced diameter extending some distance from said second end and expanding in diameter to form abutments facing said first end on said jaws and providing an inner opening with a concave spherical surface at the bottom opening toward said second end;

(b) a second member with a centerline coincident with the other axis, having attachment means at one end to attach to the other of the machine members, a generally central second bore opening toward the other end, a second plurality of jaws peripherally spaced about and extending axially some distance from said other end with second openings therebetween opening radially outward from said second bore;

(c) a generally cylindrical thrust element with a convex spherical surface forming one end sized to fit said concave surface, a generally cylindrical extension forming the other end, a flange larger than said reduced diameter and smaller than said inner opening situated between said convex surface and said other end, said flange having a plurality of peripherally distributed and axially extending slots to accept axial passage of said reduced diameter which forms the radially inner diameter of said first plurality of jaws;

(d) securing means to axially secure said thrust element in said second bore when said spherical surfaces are in contact and said element is rotated to juxtapose said slots and said first plurality of openings and after said second member is axially positioned relative to said first member to cause said first and said second plurality of jaws to interdigitate for rotational coupling of said machine members; and (e) clearances between opposed surfaces on said members and between said flange and said abutments to permit both said first and second members to rotate about axes that intersect in the vicinity of the center of radius of said spherical surfaces and deflect an amount up to said preselected amount.

2. The coupling of claim 1 wherein said concave spherical surface is on a thrust receiving element that fits into and is removable from said second bore.

3. The coupling of claim 1 wherein said convex surface terminates at said flange.

4. The coupling of claim 3 wherein said abutments and said flange are axially positioned near a transverse plane containing said point.

5. The coupling of claim 1 wherein said means to secure comprises a set screw threadedly carried in said second member, extending along a line, having a radial component of direction, into a recess in the surface of said thrust element.

6. The coupling of claim 1 wherein said means to secure comprises a pin extending through generally transverse pin bores in said second member and said thrust element.

7. The coupling of claim 1 wherein said second bore is of such diameter that said second plurality of jaws axially traverse said slots.

8. The coupling of claim 1 wherein said attachment means is achieved by machining one of said bores and one of said plurality of jaws directly into at least one of said machine members.

9. An improved shaft coupling that accepts limited deflection of the axes of rotation of coupled shafts and carries axial forces on surfaces independent of surfaces used to transmit torque, the coupling comprising:

(a) rotational coupling means arranged to transmit torque between two machine members that have independent rotational axes that intersect at a point within the coupling means such that one axis may deflect from a line containing the other axis with an angle up to a preselected amount;

(b) axial coupling means arranged to axially couple said machine members and accept forces in both axial directions;

the improvement wherein the axial coupling means comprises (c) a thrust seat, mounted on one said machine member, with a concave spherical surface opening toward the other machine member;

(d) an axial stress element with a convex spherical surface, sized to fit said concave surface, with a center of radius located on said line, an abutment facing away from said convex surface, said abutment having a plurality of peripherally distributed slots opening radially outward, and means for attachment to said other machine member after the coupler is assembled in position to transmit torque;

(e) axial capture lugs peripherally distributed about said line on said one machine member sized to move through said slots and engage said abutments after said axial stress element is rotated to place said abutment, between said slots, in opposition to said capture lugs.

10. The coupling of claim 9 wherein said machine members are jaw coupling members with means on each to attach said jaw coupling members to said shafts.

11. The coupling of claim 10 wherein a first said jaw coupling members carries said concave surface on a removable element.

12. The coupling of claim 11 wherein a second of said jaw coupling members has a bore into which a generally cylindrical end of said axial stress element is removably carried and retained therein by restraint means.

13. The coupling of claim 12 wherein said restraint means comprised a set screw threadedly carried in said second coupling member.

* * * * *